UNITED STATES PATENT OFFICE.

FRANZ von KÜGELGEN AND FRITZ von BIDDER, OF HOLCOMBS ROCK, VIRGINIA, AND GEORGE O. SEWARD, OF EAST ORANGE, NEW JERSEY, ASSIGNORS TO VIRGINIA LABORATORY COMPANY, OF NEW YORK, N. Y., A CORPORATION OF NEW YORK.

PURIFYING ELECTROLYTES.

1,095,609. Specification of Letters Patent. Patented May 5, 1914.

No Drawing. Application filed September 16, 1908, Serial No. 453,259. Renewed November 21, 1913. Serial No. 802,326.

*To all whom it may concern:*

Be it known that we, FRANZ VON KÜGELGEN, a subject of the German Emperor, and FRITZ VON BIDDER, a subject of the Russian Emperor, both residing in Holcombs Rock, in the county of Bedford and State of Virginia, and GEORGE O. SEWARD, a citizen of the United States, residing in East Orange, in the county of Essex and State of New Jersey, have jointly invented certain new and useful Improvements in Purifying Electrolytes, of which the following is a specification.

In the electrolytic production of light metals from their fused salts, the presence of even small quantities of impurities in the electrolyte leads to trouble in a continuous run if such impurities are salts of less electro-positive metals than the metal sought and which do not alloy with the desired metal. Such metals fall to the bottom of the electrolytic vessel after being decomposed and form there a conductive mass. Besides such decomposable metallic impurities, there occur in the commercial salt of the metal sought also small quantities of compounds which do not dissolve in the electrolyte, but settle down to the bottom. These are generally pyro-conductive materials, so that the result in a long run is the formation of a partly metallic conductive layer around the upwardly projecting submerged cathode (which we preferably use in such work), which has a decidedly injurious effect on the electrolysis. This is particularly noted in the production of alkali-earth metals, which demand in their production a high current density at the cathode. Such a conductive layer around the cathode will reduce the current density more and more as it accumulates. When such an accumulation has gone to a certain extent, the earth alkali metal sought commences to separate in a spongy state, instead of molten, and finally the separation of metal at the cathode ceases entirely. The same phenomenon occurs in the electrolysis of alkali chlorids, though the effect is not so pronounced nor so quickly fatal.

The present invention provides a method of removing such objectionable impurities from the electrolyte prior to electrolysis and consists in a partly mechanical, partly electrical, purification of the salt of the metal sought before introduction into the electrolytic vessel.

As an illustration of our process, we will describe the purification of sodium chlorid prior to electrolysis.

The commercial salt is melted in an electric furnace with carbon electrodes in a crucible composed of the chilled salt itself, the current (preferably alternating current) being brought in through one electrode and out through the other so that the salt is maintained molten for only a controllable distance around the electrodes, the material of the shell or case of the melting crucible not coming at any time in contact with the molten salt. By maintaining a convenient portion of the salt molten for a certain time, the mechanical impurities in the salt settle out therefrom, and clear and almost entirely purified salt could be ladled out from the furnace, or, if the melting furnace was arranged to tilt, the salt could be poured in purified form therefrom.

In the purification of sodium chlorid, such a mechanical purification is nearly ideal, but we find that there still remain certain impurities in solution which cannot settle out mechanically while maintaining the chlorid molten by alternating current. Such impurities are then removed by replacing the alternating current by direct current for a short while. Being less electro-positive they are decomposed before the sodium chlorid, and the metals formed settle to the bottom, leaving the sodium chlorid entirely pure and ready for the electrolytic vessel.

We may operate our invention by first settling the mechanical impurities in a melting furnace operated by alternating current, and then removing the partly or nearly purified salt to another melting furnace where it is completely purified by means of direct current. We can, however, operate both steps of the process simultaneously by direct current alone. By using small anodes and comparatively large cathodes so that the voltage is high and of low intensity, the less electropositive impurities are decomposed, while the metal sought is separated only to a limited extent.

A convenient way of employing the direct current alone would be to use as a cathode in the melting furnace a heavy metal which would be maintained molten and which would absorb the impurities and the small amount of sodium produced after the impurities are separated out. For example, lead could be used as the molten cathode in purifying sodium chlorid. Another variation of our process would be to maintain the salt to be purified molten with alternating current and keep in contact with it some of the more electro-positive metal sought, which would decompose the less electropositive impurities, the metals from which would then settle to the bottom. In the purification of sodium chlorid, for example, we would melt the salt in a vessel with the alternating current and keep metallic sodium in contact with the molten salt, protecting the sodium from the air by a suitable cover, which being remote from the source of heat and hence much cooler than the chlorid, prevents loss of the sodium by evaporation. Whichever variation of our process is used, the result is the same—we obtain from a more or less impure commercial salt a perfectly pure salt freed from its mechanical and dissolved impurities and suitable for feeding into the electrolytic vessel in which the metal of that salt is separated by the direct current.

In many cases the mere remelting and mechanical settling out of the impurities will be sufficient; in other cases both the mechanical and electrolytic purification will be necessary. It depends on the nature of the commercial salt used.

While we have specifically mentioned the chlorids as being susceptible to purification by our process, we do not limit ourselves to chlorids. Other halogen compounds may be treated in the same manner.

We consider our process of particular advantage in the manufacture of alkali and alkali-earth metals, as we have found that a continuous electrolysis can not be carried on unless such preliminary purification is adopted. An incidental advantage of our process is that it dehydrates the material at the same time, so obviating the necessity of decomposing the moisture present in the salt in the electrolytic vessel.

What we claim is:—

1. In the electrolysis of molten salts, fusing the salt and treating it with a suitable current until the heavier impurities precipitate, then treating the molten salt with direct current to decompose the less electropositive impurities, until the foreign metals thereby separated precipitate, and thereafter decomposing the purified salt by electrolysis.

2. In the electrolysis of molten sodium chlorid, fusing the salt and treating it with a suitable current while maintaining over it a pool of sodium, until the heavier impurities precipitate, then treating the molten salt with direct current to decompose the less electro-positive impurities, until the foreign metals thereby separated precipitate, and thereafter decomposing the purified salt by electrolysis.

3. In the electrolysis of molten salts, fusing the salt by a current between electrodes while the fused salt is held in a crucible of the solid salt, maintaining a suitable current until the heavier impurities precipitate, then treating the molten salt with direct current to decompose the less electro-positive impurities, until the foreign metals thereby separated precipitate, and thereafter decomposing the purified salt by electrolysis.

4. In the electrolysis of molten salts, purifying the salt by fusing it by a current between electrodes while the fused salt is held in a crucible of the solid salt, maintaining a suitable current until the heavier impurities are precipitated, and thereafter decomposing the purified salt by electrolysis.

5. In the electrolysis of molten salts, fusing the salt and treating it with a suitable current between an anode and a molten cathode of heavy metal until the heavier impurities are precipitated and absorbed by such molten cathode, and thereafter decomposing the purified salt by electrolysis.

6. In the electrolysis of sodium chlorid, treating the molten salt with a suitable current while maintaining over it a pool of sodium, until the heavier impurities precipitate, and thereafter decomposing the purified salt by electrolysis.

7. In the electrolysis of sodium chlorid, treating the molten salt with a suitable alternating current until the heavier impurities precipitate, and thereafter decomposing the purified salt by electrolysis.

8. In the electrolysis of molten salts, purifying the salt by treating it first with an alternating current and afterward with a direct current, to precipitate the heavier impurities, and thereafter decomposing the purified salt by electrolysis.

9. In the electrolysis of sodium chlorid, treating the molten salt first with an alternating current and afterward with a direct current, to precipitate the heavier impurities, and thereafter decomposing the purified salt by electrolysis.

In witness whereof, we have hereunto signed our names in the presence of two subscribing witnesses.

FRANZ von KÜGELGEN.
FRITZ von BIDDER.
GEORGE O. SEWARD.

Witnesses as to Franz von Kügelgen and Fritz von Bidder:
HARRY R. LEE,
J. H. WEBB.

Witnesses as to George O. Seward:
FRED WHITE,
THEODORE T. SNELL.